United States Patent [19]
Anders et al.

[11] 3,778,708
[45] Dec. 11, 1973

[54] METHOD OF AND AN APPARATUS FOR MEASURING AN ELECTRICAL CHARACTERISTIC OF A GRANULAR MATERIAL

[75] Inventors: Raymond H. Anders, Madison; Helmut G. Folgmann, Huntsville, both of Ala.

[73] Assignee: GTE Automatic Electric Laboratories Incorporated, Northlake, Ill.

[22] Filed: Apr. 30, 1973

[21] Appl. No.: 355,847

[52] U.S. Cl. ................................................ 324/62
[51] Int. Cl. ........................................... G01r 27/02
[58] Field of Search ............................ 324/62, 65 R

[56] References Cited
UNITED STATES PATENTS
1,890,545  12/1932  Limbrick .......................... 324/62 X
3,114,613  12/1963  Neitzel et al. .................. 324/65 R X Primary Examiner—Stanley T. Krawczewicz
Attorney—L. N. Arnold et al.

[57] ABSTRACT

A method of and an apparatus for measuring an electrical characteristic of a granular material such as carbon granules comprises the step of turning a test cell containing the carbon granules to agitate and to pack the carbon granules automatically and uniformly within the test cell for each of a series of measurements of the electrical characteristic. In the preferred method and apparatus, the test cell is filled through an orifice and then a gate for the orifice is closed to enclose a predetermined volume of carbon granules; and means are shifted to provide additional space or volume within the test cell to allow the particles to redistribute and to repack with turning of the test cell. Means in the form of an electric motor and a circuit control the turning and automatic stopping of the test cell movement. A readout means in the form of a digital readout meter provides the electrical characteristic measurement value.

11 Claims, 4 Drawing Figures

METHOD OF AND AN APPARATUS FOR MEASURING AN ELECTRICAL CHARACTERISTIC OF A GRANULAR MATERIAL

This invention relates to a method of and apparatus for measuring an electrical characteristic of a particulate material and more particularly to measuring of an electrical characteristic of a fraction of carbon granules.

Granular carbon of the kind used for electrical applications and specifically of the kind used in the telephone industry for telephone transmitters is formed from anthracite coal and is in the form of very fine granules having irregular contact surfaces. It is difficult to obtain consistent accurate measurements of an electrical property, such as the electrical resistance of such carbon granules, because the granules rearrange and provide different flow paths therethrough with agitation, compaction or with changes in the matrix arrangements of the irregular contact areas of the granules. For instance, the granules tend to settle by sliding relative to one another merely when resting in a test cell, this change in the matrix condition with time being herein called "aging;" and it has been observed that measurements of electrical resistance at different points in time may differ merely because of this aging process. On the other hand, an exertion of pressure on the carbon granules compacts the granules and drops very quickly the resistance of the carbon granules. Thus, it will be seen that carbon granules are thus extremely sensitive to agitation and to packing states unlike many other granule particles which have harder, smoother and more uniform surfaces.

Prior to the present invention, one commercially used method for testing the electrical resistance of carbon granules required skilled operators to achieve consistent results and hence was an art which had to be learned. In this method, carbon granules were poured into a funnel having a precise shape at a predetermined height above the wall of the funnel with operator following the contour of the test cell during the pouring of particles therein. After filling, a razor blade held at a precise angle, for example 60° to the horizontal, was used to scrape the carbon level with the top of the test cell and care was taken not to disturb the carbon granules in the test cell. A current was then applied to the granules in the test cell and it was adjusted to a predetermined value, for example 100 milliamps; and a volt meter was read and interpolated to the nearest one-tenth volt. The granular carbon was then emptied from the test cell. The above-described operation was repeated ten times, and the ten read-outs were averaged to provide an average value which herein is termed a "specific electrical resistance" for the fraction being tested.

Although the testing procedure above described was generally satisfactory, it did require a skilled operator and was a relatively slow manual process. Moreover, operator error could be readily introduced such as by variations in the pressure exerted on the carbon particles by the razor blade or by vibrations in the operator's pouring rate and height thereby causing variations in agitation and packing of the granule particles in the test cell. The loading and unloading of the test cell for each of the ten measurements was not only a very slow process but caused an "aging" of the carbon particles resulting in further deviations for the fraction being tested.

Accordingly, a general object of the present invention is to provide a new and improved method of and apparatus for testing granular material.

A more specific object of the invention is to provide a more automatic and accurate method of an apparatus for measuring an electrical characteristic of carbon granules.

These and other objects of the invention will become more apparent from the following detailed description taken in connection with the accompanying drawings in which.

Figure 1:
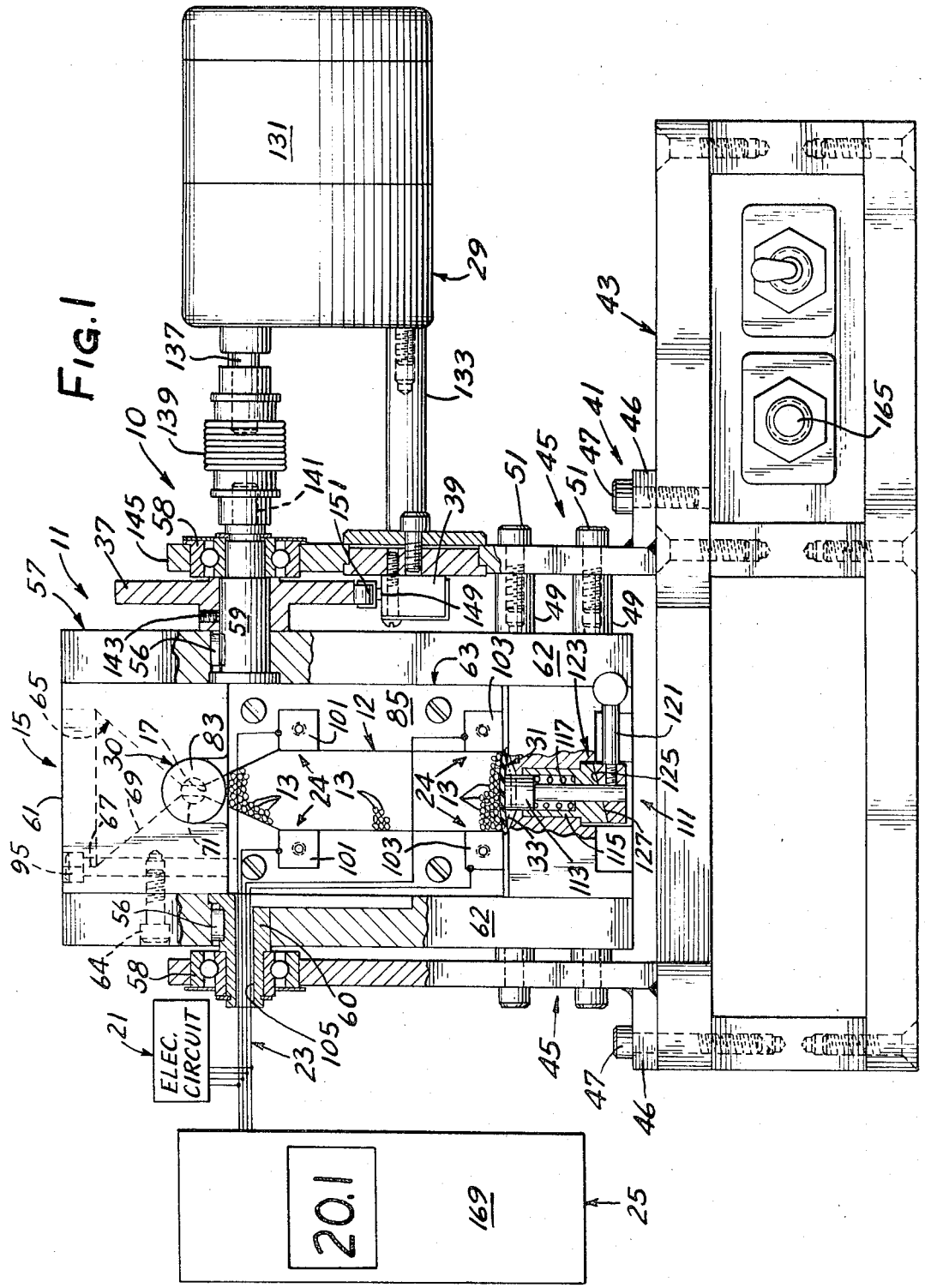
FIG. 1 is a front elevational view partially in cross-section of an apparatus embodying the novel features of the invention.

As shown in the drawings for purposes of illustration, the invention is embodied in a method of and an apparatus 10 for testing a granular material, such as carbon granules, which are but a fraction of a larger body of material and for which at least one electrical characteristic is to be determined. In this embodiment of the invention, the specific electrical resistance of a fraction of carbon granules being processed in a rotating furnace is determined and this information is utilized to control operating parameters for the furnace such as the temperature in the furnace which greatly affects the ultimate electrical resistance of the carbon granules. Very generally, the apparatus 10 comprises a test cell means 11 having a test cell chamber 12 for receiving a fraction of carbon particles of granules 13. The chamber 12 is filled with carbon particles through a filling means in the form of a filling funnel 15 disposed above the chamber 12 with carbon granules flowing through the funnel 15 and into an inlet orifice or opening 17 located at the top of the test cell chamber 12. An electrical circuit means 21 is provided for applying electrical current to the granular carbon and includes electrical leads 23 extending to test cell electrodes 24 and to an indicating or read-out means 25.

As explained above, the prior art process of scraping the top of the test cell to remove the excess carbon from the top of the test cell to provide an exact volume of carbon for testing require a considerable care and skill in the attempt to achieve a uniform application of pressure to the carbon particles as differences in compaction of the particles caused significant deviations in the electrical resistance for a given fraction. In this process, the granular carbon was removed from the test cell after each reading; and then returned to the test cell to obtain ten readings each of which usually varied from the other readings. An average was taken of the ten readings. This filling and emptying caused the carbon to "age" that is to change its matrix or packing state and as a result the later readings were considerably higher in resistance than the initial readings due to the change in the packing states. Moreover, the loading, scraping and unloading resulted in a relatively slow and costly process.

In accordance with the present invention, more accurate and uniform test results are achieved with a more automatic testing process in which the carbon particles 13 are compacted more uniformly and more quickly between successive read out cycles without having to empty and refill the test cell. To these ends, a predetermined volume of carbon particles 13 is placed in the test cell chamber 12 and a free or open space is provided in the chamber 12 to allow the particles to shift and move when the test cell means 11 is turned by a means such as a motor means 29. In this instance, the test cell is turned through 180° to an inverted position allowing the particles to drop and redistribute themselves in a natural or free packing state. The test cell is then reversed in its direction of turning with the particles again redistributing and rearranging when motion is stopped.

In the illustrated embodiment of the invention, the initial predetermined volume is achieved by filling the test cell chamber 12 and closing its inlet orifice 17 by means such as a gate or valve slide 30. To provide the test cell 12 with a larger predetermined volume and a free space, means for example, such as a wall means 31 is shifted from a first position for filling to an expanded or second position providing the greater volume for the test cell chamber. In this illustrated embodiment of the invention, the wall means 31 is in the form of a rubber diaphragm 33 which is shifted from a first filling position, shown in solid lines in FIG. 1 at the time of filling to a second or testing position shown in dotted lines at the time of testing.

With the free space in the test cell chamber 12, the particles may be quickly and readily realigned for each of the following tests without removal thereof from the test cell means 11. Preferably, automatic control means 35 is provided for turning the test cell means 11 in one direction and then for automatically reversing the direction of turning of the test cell means after a predetermined amount of turning movement, which in this instance is 180° of turning movement. Herein, the control means 35 also automatically stops the turning of the test cell means. The control means 35 comprises a cam 37 and a switch means including switches 39 and 40 operated by the cam 37 to reverse the movement of turning when the test cell means 11 turns from the lower filling position shown in FIG. 1 to an inverted position shown in FIG. 4.

Figure 2:
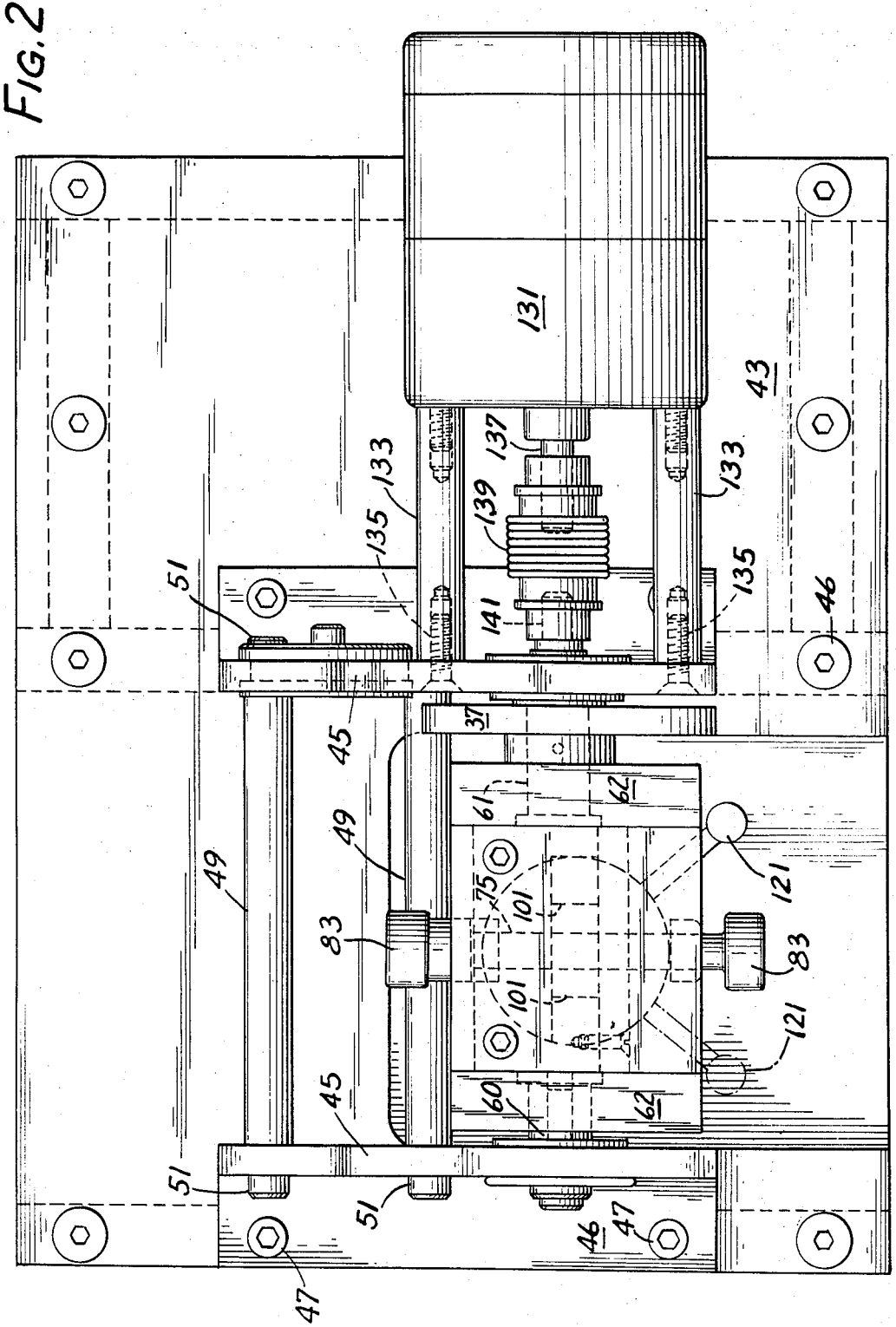
FIG. 2 is a plan view of the apparatus of FIG. 1.
Figure 3:
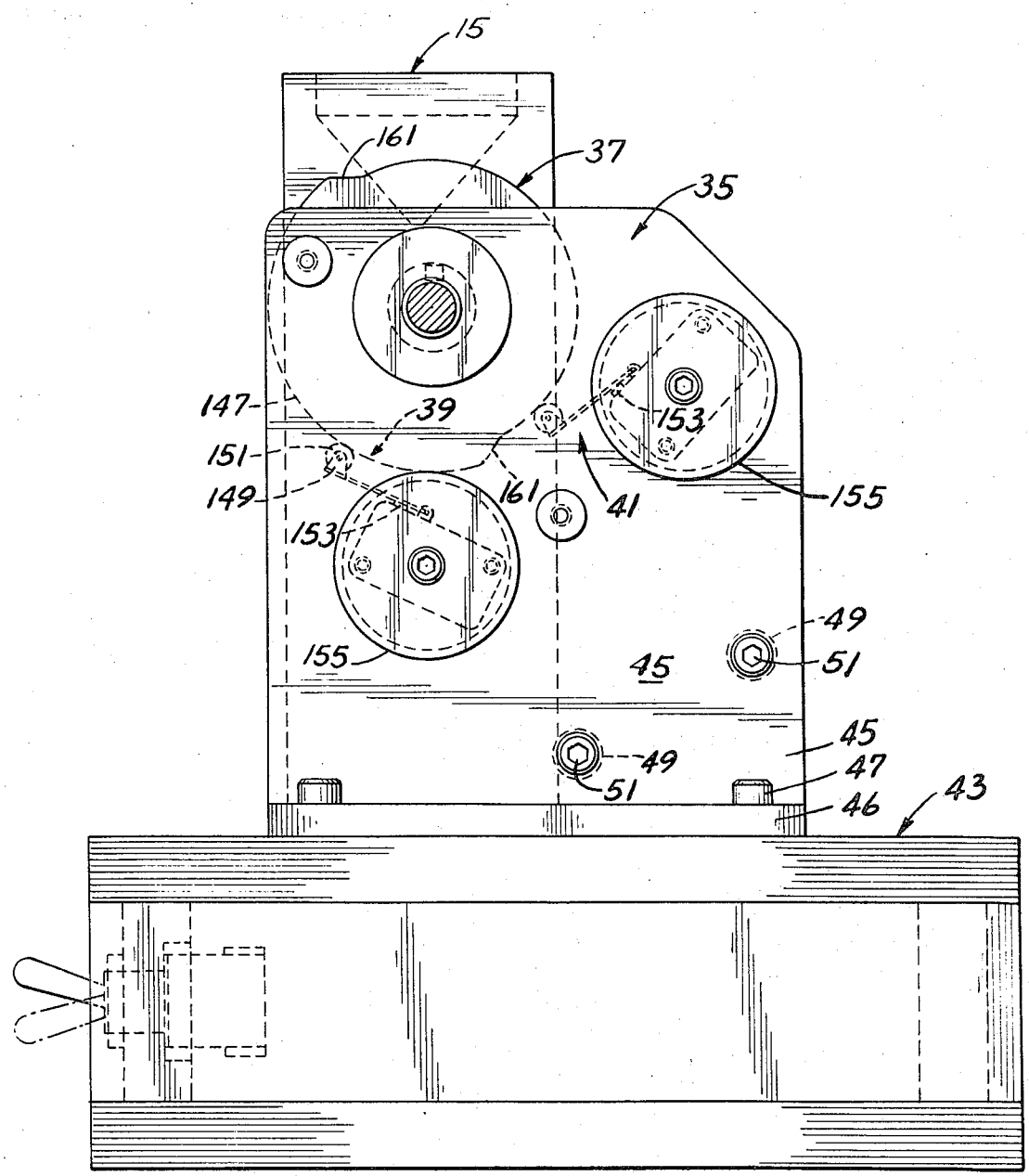
FIG. 3 is a side elevational view of the apparatus of FIG. 1 but with an operating motor removed for purposes of illustration.

Referring now in greater detail to the individual elements illustrated in the drawings, the test cell means 11 is mounted for turning in a frame means 41 which includes a base 43 for resting on a table or suitable support and a pair of upstanding frame members or brackets 45 having lower horizontal flanges 46 which are secured by suitable fasteners 47 to the top of the base 43. To provide additional rigidity for the upstanding brackets 45, a pair of horizontally disposed brace rods 49, as best seen in FIGS. 1, 2 and 3, extend between the brackets 45 and are secured thereto by suitable fasteners 51.

The test cell means 11 is supported for turning about a predetermined axis, in this instance a horizontal axis, between the upstanding brackets 45 by axle means in the form of a pair of trunnion shafts 59 and 60 each journaled in a bearing 58 mounted in the upper ends of the brackets 45. More specifically, the test cell means 11 is comprised of a test cell 63 in which is formed the chamber 12 and a carrier 57 which supports the test cell for turning about the axis through the trunnion shafts. The carrier 57 comprises a pair of vertically extending trunnion plates 62 having coaxially aligned openings each receiving one end of one of the respective trunnion shafts 59 and 60 which are keyed thereto by keys 56. The carrier trunnion plates 62 are spaced intermediate the brackets 45 and above the base 43 for turning and carrying the test cell 63 through repetitive turning movements.

Preferably, the test cell means 11 further includes the filling funnel 15 which also is carried by the carrier 57 for rotation therewith about the axis through the trunnions 59 and 60. The preferred filling funnel 15 is formed in a glass block 61 which spans the vertical trunnion plates 62 and is secured thereto by fasteners 64. A funnel shaped bore 65 (FIGS. 1 and 4) is formed in the block 61 leading to the inlet orifice 17 for the test cell chamber 12. The funnel shaped bore 65 comprises an upper cylindrical portion formed by a circular bore wall 67 leading to a downwardly converging frusto-conical wall 69 having an outlet orifice at the top of a horizontally extending bore 71 in which is mounted the gate slide 30.

Figure 4:
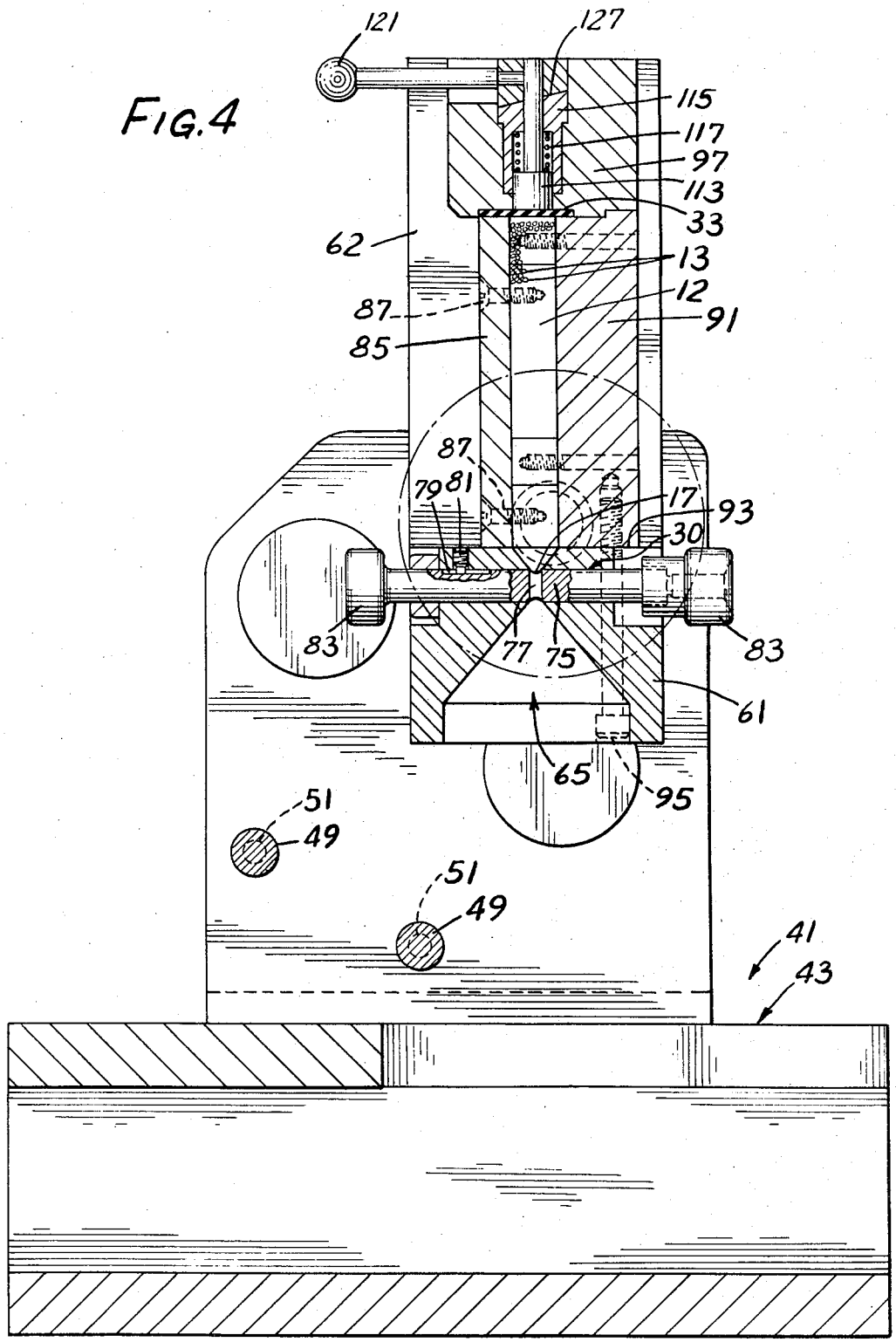
FIG. 4 is a cross-sectional view of the apparatus of FIG. 1 with a test cell inverted to an emptying position.

More specifically, the preferred gate slide 30 for closing the top of the test cell chamber 12 after filling the same with carbon paticles 13 includes a horizontal slide rod 75, as best seen in FIG. 4, which has a small diameter bore 77 therein which when aligned with the outlet orifice at the bottom of the filling funnel bore 65 permits granules to flow therethrough to the inlet orifice 17 for the chamber 12. The illustrated rod 75 is circular in cross section and extends horizontally in the bore 71 and is provided with a key way 79 into which is projected a key 81 for constraining the rod for reciprocal movement and for maintaining its bore 77 in a vertical plane. The slide rod 75 is provided at opposite ends with knobs 83 to facilitate pushing or pulling the slide rod between the open position in which its bore 77 is aligned with the funnel bore 65 and the inlet orifice 17 and the closed position in which the rod blocks the orifice 17. As will be described in greater detail, the operator will drop particles into the filling funnel 15 and fill the test cell chamber 12 until it is completely full and then the operator will push slide 30 to cause a solid unperforated portion of the slide rod 75 to seal the orifice 17 against leaking of carbon particles from the test cell when it is inverted as shown in FIG. 4. This also provides a precise predetermined volume, herein, the volume being 10 cubic centimeters. After testing the ten samples, the test cell 63 may be inverted and the slide 30 slid to open position to allow the particles to discharge and empty the test cell chamber 12.

The illustrated test cell 63 is formed of multiple sections including a transparent front plate section 85 of Plexiglas or the like which is fastened by suitable fasteners 87 to an insulated body such as a phenolic body section 91 which forms the vertical sidewalls and rear walls for the chamber 12. The rear body section 91 has its upper end abutting a bottom wall 93 of the filling funnel block 61 and is secured thereto by suitable fasteners 95. Likewise, the front section 85 abuts the bottom wall 93 of the block 61. The lower end of the respective front and rear sections abut a bottom block 97 which is fastened to these sections and also to the upstanding trunnion plates 62. The rear section is formed with the test cell chamber cavity therein with the flat front section closing the front wall of the test cell chamber 12.

Four grooves are formed in the rear body section 91 for electrodes 24 which are in the form of a pair of upper electrode blocks 101 and a pair of lower electrode blocks 103. These block-shaped electrodes are corrosion resistant and are brass with a gold plate thereon exposed to the granular carbon. Current from the upper electrodes must flow through the granular carbon to lower electrodes which are connected to the read-out means 25. The leads 23 may be secured in a suitable manner to the respective electrode blocks 101, 103 and may be extended through a central bore 105 in the trunnion 60 to the electrical circuit means and to the read-out means 25.

The flexible diaphragm 33 is made of rubber or the like and is disposed across the bottom of the test cell chamber 12 and is supported between the lower block 97 and the front section 85 and rear section 91 of the test cell 63. The lower block has a depression formed in its upper surface to allow the diaphragm to shift downwardly below a horizontal plane. In this instance, the diaphragm 33 has its lower surface secured as by a suitable adhesive to an actuating means 111 in the form of a vertically movable plunger 113 which is vertically reciprocal within a cylinder guide 115. Herein, the plunger 113 is urged upwardly by the coil spring 117 within the cylinder 115. The plunger 113 may be pulled downwardly to shift the diaphragm 33 downwardly to the lower, dotted line position shown in FIG. 1 by the turning of a lever 121 connected to a cam means 123 including a cam surface 125 meeting with a cam surface 127 on the bottom of the cylinder 115. The cam surfaces 125 and 127 are so related that by swinging the lever 121 between the limit positions shown in dotted lines in FIG. 2 that the diaphragm 33 is raised or lowered between the upper or filling position, shown in dotted lines in FIG. 1, and the lower or testing position, shown in dotted lines shown in FIG. 2.

For the purpose of turning the test cell 63, the illustrated motor means 29 includes an electric motor 131 which is mounted by a pair of horizontally extending mounted studs 133 fastened at one end to the motor and fastened at the other end by fasteners 135 to the upstanding bracket 45. The motor 131 has an output drive shaft 137 fastened to a flexible drive coupling 139 which is coupled at its other end to an end 141 of the trunnion shaft 59 connected to the carrier for turning the test cell. The preferred motor 131 is a slow speed motor, for example 10 R.P.M., and also is reversible with a change of direction of the current applied to its windings.

For the purpose of providing a quick cycle of turning and stopping of the test cell, there is provided an automatic control means including the cam 37 mounted on the trunnion 59 between the trunnion plate 62 and the adjacent upstanding stationary bracket 45. The cam 37 is secured to rotate with the trunnion by a set screw 143. The outer peripheral surface 145 of the cam 37 is contoured to operate the switches 39 and 40 which are a pair of micro switches each having an operating lever 149 and a cam follower roller 151 for rolling engagement with the peripheral surface 147 of the cam. Each of the switch levers 149 operates a switch plunger 153 to control internal contacts (not shown) which operate means such as relays in a conventional manner to cause electrical current to reverse the direction of rotation of the motor 131. In this instance, the switches 39 and 40 are mounted by suitable mounting disks 155 mounted at angularly spaced locations and in apertures formed in the upstanding bracket 45. The switches disposed on the inner side of the bracket 45 are directly beneath the cam 37. Thus, as the cam 37 rotates with the test cell 63, the contoured surface on the cam shifts the cam follower rollers 151 to pivot the levers 149 and thereby operate the plungers to reverse the direction of turning.

Each cycle of inverting and returning the test cell 63 is initiated by operation of a pushbutton switch 165 on the base 43, which causes the motor 131 to swing the test cell 63 to invert the same to the position shown in FIG. 4 whereupon one of the switches 39 or 40 completes a reversal in direction of current flow to the motor. The motor then turns the test cell 63 downwardly to the position shown in FIG. 1 at which time the other one of the switches causes the cycle to stop allowing the operator to read the reading on digital read-out voltmeter 169.

A brief description of the preferred manner of operation of the illustrated apparatus in accordance with the method of the invention will be given as an aid to an understanding of the invention. A fraction of a batch of carbon granules taken from a rotating furnace is poured into the filling funnel 15 to fill the test cell chamber 12. Preferably, the quantity of carbon granules poured into the filling funnel 15 is considerably larger than the 10 cubic centimeter capacity of the test cell chamber 12, which is its predetermined volume when the diaphragm 33 is raised to the filling position. After observing a filling of the chamber 12 through the glass front wall section 83, the slide 30 is slid to a closed position to remove the bore 77 therein from alignment with the orifice 17 for the chamber 12. Thus, there should be an exact predetermined volume of 10 cubic centimeters within the chamber for testing. The operator will then turn the lever 121 to cause the cam surfaces 125 and 127 to cam against each other and pull the slide 113 downwardly to lower diaphragm 33 thereby providing additional volume within the test chamber 12.

To cause the carbon granules 13 to become agitated and redistributed within the test and to be relieved of the initial packing state and pressure, the operator will depress the pushbutton 165 causing the motor 131 to energize and to turn the output shaft 137 and the test cell means 11 with the bottom portion of the test cell swinging upwardly toward the position shown in FIG. 4, except of course that the slide 30 will be in the closed position whereas it is shown in the open position in FIG. 4. As the cam 141 turns with the test cell 63, it operates the electric switches 39 and 40 to stop the turning in the first direction after 180° and immediately reverses the current to the motor 131 to turn the test cell downwardly and then to de-energize the motor 131 when the test cell is returned to the position shown in FIG. 1. While a resistance value is displayed on the digital readout voltmeter 169, this reading is not recorded or used. The first cycle is discarded as it has been found that the carbon particles obtain a more consistent agitated and packed state if allowed to redistribute more than once prior to taking the reading. The test pushbutton 165 is again depressed causing the above described cycle and after return of the test cell 63 to the position shown in FIG. 1 the digital readout to the nearest one-tenth of a volt is then read by the operator. Thereafter, an additional nine readings are taken, each being recorded after an operation of the pushbutton 165 and a turning of the test cell 63. Becasue of the free space in the test cell 63, the carbon granules are free to fall toward the orifice 17 and slide 30 when the test cell 63 is inverted and then are free to fall down to the diaphragm 33 when the test cell 63 is righted. Because the speed and path taken by the test cell 63 are uniform and the same sample is tested for each of the ten cycles, the deviations due to operator errors are reduced considerably from the above-described prior art process.

In the illustrated embodiment of the invention a constant current of 60 milliamps is applied across the electrodes 101, which are connected in parallel, and through the contacting surface areas of the carbon granules to the electrodes 103 which are also connected in parallel. A higher current of 100 milliamps has been used; but with the higher 100 milliamp current, some arcing occurred in the carbon particles. Arcing is to be avoided as it interferes with uniform and consistent results and fuses together carbon granules. While it is preferred to use a constant current and to read out a voltage characteristic on the voltmeter 169, a constant voltage may be applied to the carbon granules and an ammeter may be used as the readout means 25.

The illustrated digital voltmeter 169 provides an instantaneous reading to one-tenth of a volt which is sufficient accuracy for measuring carbon granules for telephone transmitter usage. Of the ten readings taken for each fraction, it has been observed that the initial voltage readings are slightly higher than subsequent voltage readings, particularly higher than the last readings for the same sample. This decrease is apparently due to an increase in temperature of the carbon granules caused by heating the carbon granules because of the current applied thereto. On the other hand, the successive turning movements for each cycle cause a slight aging of the carbon and a consequent increase in the resistance which offsets only partially the decrease in resistance resulting from the heating of the carbon granules. In any event, the standard deviation will usually range only about 0.1 to 0.3 volts for the ten cycles; and this is considerably less than the standard deviation obtained with the prior art process above described.

While the above-described preferred operation of the invention is preferred, it is to be understood that test cell chamber 12 may be made with a different shape or capacity from that described herein and likewise different readout devices 25 such as automatic recorders may be substituted for the voltmeter described herein. Also, the test cell may be turned through a lesser or a greater degree of turning then the preferred and described 180° of turning movement. For instance, the test cell may be rotated through a full revolution rather than through a half revolution as described herein.

From the foregoing, it will be seen that the present invention is particularly useful to achieve a uniform agitation of the granules and a uniform compaction or packing state for granules prior to measuring an electrical characteristic thereof. Also, measurements may be made quickly and accurately for a series of measurements of the same sample. More specifically, because of the additional or free space within the test cell chamber, the granules are free to realign with the cell for each cycle. These test cycles are performed without the slow, tediuos manual emptying and refilling of the test cell used in the prior art method. The method and apparatus have been found to reduce operator-induced errors and to provide a faster and more economical way of making such electrical measurements for carbon granules.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of testing an electrical characteristic of granular carbon in a test cell comprising the steps of: introducing a predetermined volume of granular carbon into the test cell through an opening therein, providing a free space in the test cell unoccupied by the granular carbon, turning the test cell about a predetermined axis to allow the granular carbon to pack freely within the test cell, and measuring an electrical characteristic of the granular carbon after turning said test cell to pack said granular carbon therein.

2. A method in accordance with claim 1 including the further steps of: turning the test cell first in one direction and then turning the test cell in the opposite direction and the reading out the electrical characteristic of the granular carbon.

3. A method in accordance with claim 2 including the steps of repetitively cycling the turning of the test cell in opposite directions without emptying the test cell to allow the granular carbon to redistribute for a series of test measurements.

4. A method in accordance with claim 1 in which the step of providing a free space in said test comprises the step of: shifting one wall of the test cell from a first position providing a first predetermined volume for said test cell to a second position providing a greater volume for the test cell to allow the movement of the carbon particles therein.

5. An apparatus for testing an electrical characteristic of granular carbon comprising: a frame means, a test cell means mounted on said frame means for turning about a predetermined axis and having an opening leading to a chamber for receiving granular carbon therein, means for closing said opening to said chamber in said test cell means for containing the granular carbon therein during a turning of said test cell means, means associated with said test cell means movable from a first position providing the test cell means with a first predetermined volume at the time of filling to a second position to provide a larger predetermined volume during the time of turning thereby allowing the granules to assume a free packing state in said test cell means, means for turning said test cell means about a predetermined axis, electrical circuit means for completing a circuit through the granular carbon in said test cell means, and means for providing an indication of the electrical characteristic of the granular carbon in said test cell means.

6. An apparatus in accordance with claim 5 in which said means for turning said test cell means comprises a motor means, and a reversing means for automatically reversing the turning direction of said test cell means after a predetermined amount of turning movement in one direction.

7. An apparatus in accordance with claim 6 in which said reversing means comprises a cam means and a switch means operated by said cam means, said motor means comprises a reversible motor, said cam means being operable to operate said switch means to reverse the direction of turning of said test cell means by said reversible motor after the latter has turned through approximately 180° of turning movement.

8. An apparatus in accordance with claim 7 in which said means for increasing the volume of said test cell means comprises a flexible diaphragm covering one end of said test cell means, and means for shifting said flexible diaphragm between said first and second positions.

9. An apparatus in accordance with claim 6 in which said chamber of said test cell means is disposed radially outwardly of said axis of rotation so that the granular carbon moves outwardly in the same direction under the urging of centrifugal force when said test cell is turning.

10. An apparatus for testing the electrical resistance of granular carbon comprising: a frame means, a rotatable carrier means journalled in said frame means for turning movement in said frame means about a predetermined axis, a motor drive means for turning said carrier means in opposite directions, a filling means on said carrier means for receiving granular carbon therein, a test cell carried by said carrier means and disposed beneath said filling means for receiving therefrom granular carbon through an opening leading to a chamber in said test cell, means between said filling means and said test cell for closing said opening to define a predetermined volume of granular carbon in said test cell when it is filled and to retain the granular carbon during turning of the test cell, a flexible diaphragm at the other end of said test cell for closing a lower end of said test cell, means for shifting said flexible diaphragm between a first position at the time of filling to provide a predetermined volume and to another position to provide another and larger volume for testing, electrical circuit means for supplying current to said granular carbon in said test cell, means for automatically reversing the turning direction of said carrier means and the test cell carried thereby to provide a free packing of said granular carbon in said test cell, and read-out means for providing a read-out of at least one electrical characteristic of the freely packed granular carbon in said test cell.

11. An apparatus for testing an electrical characteristic of granular carbon comprising: a frame means, a test cell means mounted on said frame means for turning about a predetermined axis and having an opening leading to a chamber for receiving granular carbon therein, means for closing said opening to said chamber in said test cell means for containing the granular carbon therein during a turning of said test cell means, means for turning said test cell means about predetermined axis to redistribute said carbon granules therein, electrical circuit means for completing a circuit through the granular carbon in said test cell means, and means for providing an indication of the electrical characteristic of the granular carbon in said test cell means.

* * * * *